(12) United States Patent
Abe et al.

(10) Patent No.: US 8,351,664 B2
(45) Date of Patent: Jan. 8, 2013

(54) BIOMETRIC AUTHENTICATION DEVICE AND BIOMETRIC AUTHENTICATION METHOD

(75) Inventors: Tadayuki Abe, Ichinoseki (JP); Masayuki Abe, Yokohama (JP); Hiromi Sugo, Kanegasaki (JP); Kenichi Mizuishi, Hachioji (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 951 days.

(21) Appl. No.: 12/417,025

(22) Filed: Apr. 2, 2009

(65) Prior Publication Data

US 2010/0008544 A1   Jan. 14, 2010

(30) Foreign Application Priority Data

Jul. 10, 2008   (JP) ................................ 2008-180477

(51) Int. Cl.
*G06K 9/00* (2006.01)
(52) U.S. Cl. ..................................................... 382/124
(58) Field of Classification Search .................. 382/124
See application file for complete search history.

(56) References Cited

U.S. PATENT DOCUMENTS 6,122,394 A * 9/2000 Neukermans et al. ........ 382/124
2005/0180617 A1* 8/2005 Yumoto et al. ................ 382/124

FOREIGN PATENT DOCUMENTS

| JP | 2003-129712 | 5/2003 |
| JP | 2005-350960 | 12/2005 |
| JP | 2006-251961 | 9/2006 |

* cited by examiner

*Primary Examiner* — John Strege
(74) *Attorney, Agent, or Firm* — Antonelli, Terry, Stout & Kraus, LLP.

(57) ABSTRACT

A biometric authentication device includes an accommodation unit and a detection unit in which the accommodation unit accommodates a card-type recording medium providing alternative information alternative to feature information such that the card-type recording medium is faced to the detection unit, with a biologic object absent, and the detection unit detects the alternative information from the card-type recording medium, thereby collating the feature information extracted from an image of the biologic object with the feature information recorded in a memory in the case of placing the finger into the accommodation unit, and collating the alternative information from the card-type recording medium with the alternative information recorded in the memory in the case of placing the card-type recording medium into the accommodation unit.

17 Claims, 9 Drawing Sheets

BIOMETRIC AUTHENTICATION DEVICE AND BIOMETRIC AUTHENTICATION METHOD

BACKGROUND OF THE INVENTION

The present invention relates to a biometric authentication device and a method of the same, and in particularly to a biometric authentication technique to authenticate a biologic object by using a finger vein.

In these days, the biometric authentication technique has been taken notice of using inherent bodily characteristics of an individual, instead of conventionally using passwords, keys, personal stamps, etc. The biometric authentication technique has advantages such that risk is relatively low against theft, loss, unauthorized transfer, and oblivion, therefore, it has high security level.

In the various biometric authentication techniques, a finger vein authentication uses a finger vein pattern of a body's interior to realize an excellent authentication accuracy and a high level security, since a forgery or falsification is hard to be realized, compared with a fingerprint authentication.

If the above-mentioned authentication technique is applied to "a common front door locked and unlocked system" disclosed in JP-A-2003-129712, a user or human passes through a biometric authentication device installed at an entrance, and must subsequently pass through another biometric authentication device installed at a door of his/her residence.

In the meantime, there is a problem that the biometric authentication device cannot extract feature information, necessary for the authentication, caused by a reason such that some one has a fine finger vein.

Consequently, for a purpose of realizing that the above-mentioned person can be checked by the biometric authentication even though the human has the fine finger vein, it is conceivable that another authentication function is incorporated into the biometric authentication device. For example, JP-A-2006-251961 has disclosed a method in which a password authentication function is provided in a client server system having a biometric authentication function to thereby attempt to cover the human who cannot be checked by the biometric authentication.

Further, as for the authentication device that executes the human authentication at a gate, JP-A-2005-350960 has disclosed a system incorporated an IC card with the fingerprint authentication.

In addition, there arises a problem that a sensitivity of the biometric authentication device is made low to thereby deteriorate the security level, for a purpose of preventing the human from missing the biometric authentication. In the case of the existing biometric authentications, it is necessary to incorporate the existing authentication function, using the IC card, password, etc., into the biometric authentication technique, since the occurrence in which the human is not checked by the existing biometric authentication cannot be avoided, however it arises sometimes.

However, in the case of the above technique, there arises a problem that the advantage of the biometric authentication technique becomes impaired, even though the technique has high security level and excellent convenience as a substitute for the existing authentication technique, and the biometric authentication device becomes complicated, and the device cost becomes high.

SUMMARY OF THE INVENTION

An object of the invention is to provide a biometric authentication device capable of authenticating human, without using the existing authentication function with the IC card, password, etc.

In order to achieve the object of the invention, a biometric authentication device that detects feature information of a biologic object to authenticate the biologic object, comprises: a detection unit that detects an image having the feature information from a part of the biologic object; and an accommodation unit that accommodates such that the part of the biologic object is adapted to the detection unit, wherein the accommodation unit accommodates a card-type recording medium providing alternative information alternative to the feature information such that the card-type recording medium is faced to the detection unit with the part of biologic object absent, and the detection unit detects the alternative information from the card-type recording medium.

According to the invention, the biometric authentication device can be provided for authenticating a human without using the existing authentication function with the IC card, password, etc., since the accommodation unit is constituted such that it can accommodate the card-type recording medium providing the alternative information alternative to the feature information, and the detection unit can detect the alternative information obtained from the card-type recording medium.

The other objects, features and advantages of the invention will become apparent from the following description of the embodiments of the invention taken in conjunction with the accompanying drawings.

DETAILED DESCRIPTION OF THE EMBODIMENTS

Hereinafter, embodiments of the invention will be described with reference to the drawings showing a preferred biometric authentication device for use in a security system. This biometric authentication device detects feature information of a part of a biologic object, for example, the feature information obtained from a finger to a finger to authenticate the biologic object. That is, in the biometric authentication device as a finger vein authentication device, a finger as a part of the biologic object is placed into the device to then irradiate an infrared light on the finger, emitted from an infrared ray source, such as LED (Light Emitting Diode) installed above the finger. The infrared light spread in the finger transmits through the vein or reflects from it, and emits to the outside of the finger in accordance with an effect of a finger interior environment including a finger vein form (vein pattern). An image is then produced on the basis of the transmitted light emitted from the finger, and the vein pattern of the image is extracted as feature information to thereby authenticate a human.

Further, in the biometric authentication device, a card-type recording medium containing alternative information alternative to the feature information of the part of biologic object is placed into the device to irradiate the infrared light on the card-type recording medium, emitted from the infrared ray source. An image is produced on the basis of the transmitted light through the card-type recording medium, and a pseudo pattern as the alternative information is extracted from the image to thereby authenticate the human.

Figure 1:
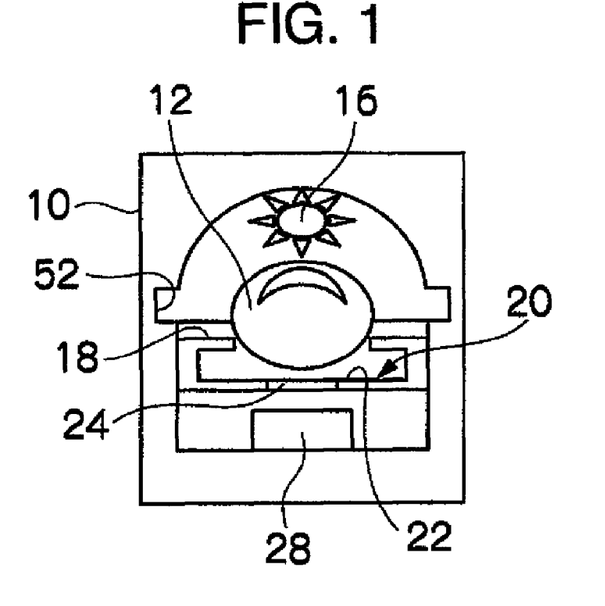
FIG. 1 is a section view showing a main portion of the biometric authentication device using the case where an authentication object is a finger in an embodiment of the invention.
Figure 2:
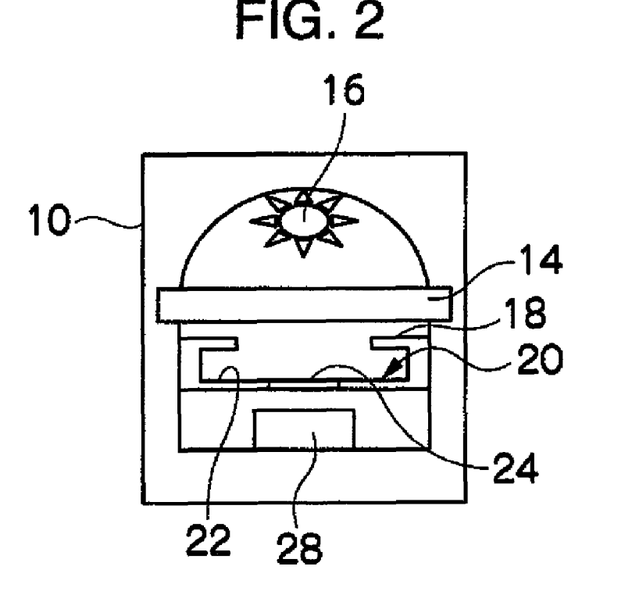
FIG. 2 is another section view showing another main portion of the biometric authentication device using the case where the authentication object is a card-type recording medium.

FIG. 1 is a section view showing a main portion of the biometric authentication device using the case where an authentication object is a finger. FIG. 2 is another section view showing a main portion of the biometric authentication device using the case where the authentication object is a card-type recording medium.

Referring to FIG. 1 and FIG. 2, the biometric authentication device is constituted by a cubical housing 10 as a whole. A space portion is formed in the housing 10 to be able to place a finger 12 as a part of a biologic object or a card-type recording medium 14 therein, and an infrared ray source 16 made up of an LED is disposed on a top of the space portion. Finger guides 18 are formed on a bottom of the space portion to place the finger 12 thereon, and a groove 20 is also formed thereon to secure a focal length between the finger 12 and an after-mentioned optical system.

The width of groove 20 is made narrower than that of the finger 12. The finger 12 of a human is placed onto the finger guides 18, and placed thereon such that the finger 12 covers the groove 20 entirely, and the infrared light is then irradiated on the surface of finger 12 from the infrared ray source 16.

A rectangular transmitted-light introducing opening 24 is formed on a bottom surface 22 of the groove 20 to introduce the transmitted light through the finger 12. An IR (Infrared) filter (not shown) is attached to the transmitted-light introducing opening 24. The IR filter shields an outside light unnecessary for the authentication, such as lights of the sun, fluorescent lamp, etc, and prevents from entering dust, droplets, etc. into the biometric authentication device. Further, a lens mechanism and an image pickup device are disposed on the underside of bottom surface 22, as an optical system. In this way, the image is produced on the basis of the transmitted light introduced from the transmitted-light introducing opening 24 by the lens mechanism and image pickup device.

Figure 3:
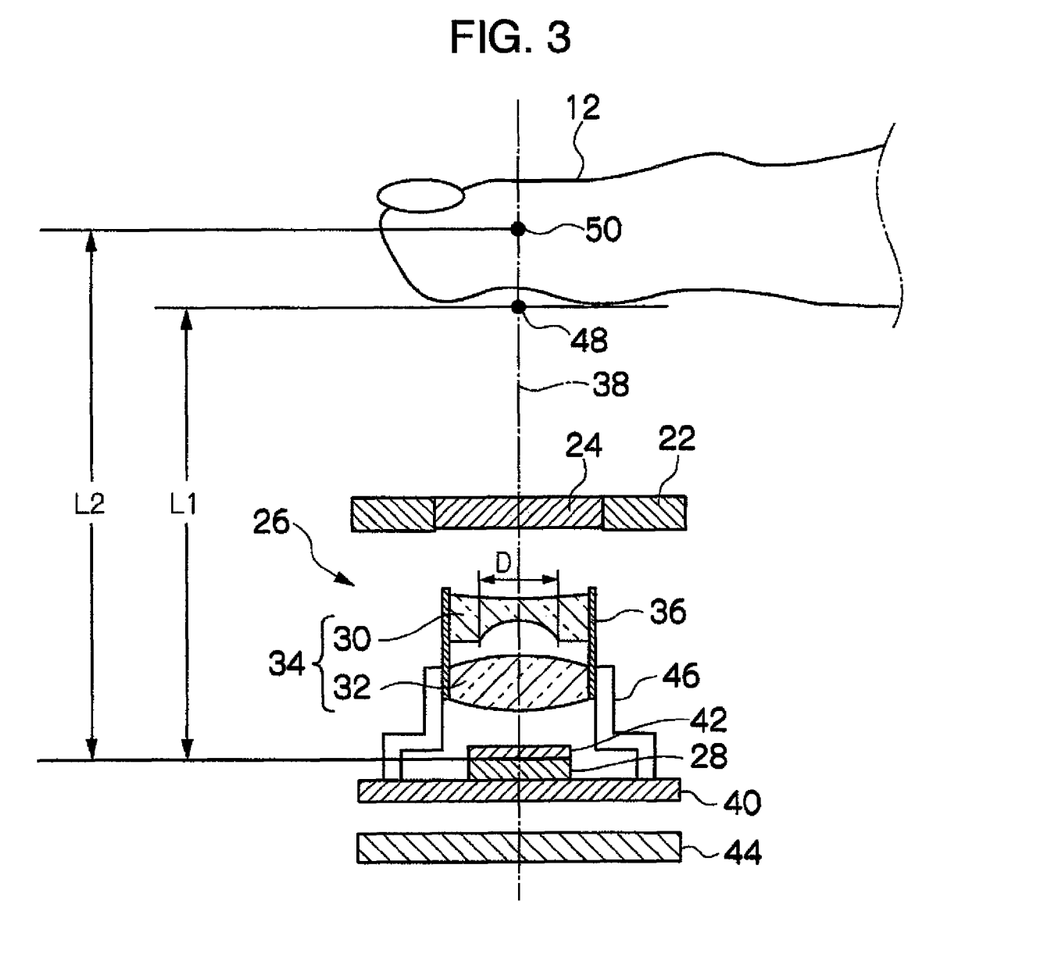
FIG. 3 is a schematic diagram for explaining a positioning relation between the finger and an optical system.

FIG. 3 is a schematic diagram showing an example of a positioning relation between the finger and the optical system of the biometric authentication device.

Referring to FIG. 3, a lens mechanism 26 as the optical system is constituted such that a lens unit 34 consisting of a first lens 30 on the finger side and a second lens 32 on the image pickup device side are fixed supportively to a lens housing 36 to make the transmitted light form an image on an image pickup device 28. The first lens 30 and second lens 32 are accommodated in the lens housing 36 such that they are opposed to each other along an optical axis 38.

The first lens 30 and second lens 32 are an extremely small diameter lens to be equal to or less than 2.0 mm in an effective diameter D, desirably 1.0 to 1.5 mm. The first lens 30 is formed such that its surface toward the image pickup device 28 is concave, that is, it is a concave lens entirely having a negative magnifying power. The second lens 32 is formed such that its surfaces toward the finger 12 and the image pickup device 28 are convex, that is, it is a convex lens entirely having a positive magnifying power.

The image pickup device 28 is constituted by CCD (Charge-Coupled Device) or CMOS (Complementary Metal-Oxide Semiconductor) to be fixed on a circuit board 40. A transparent layer 42 is formed on the surface of image pickup device 28 to protect the device 28. The circuit board 40 is supported to a bottom surface portion 44 of the housing 10.

The lens housing 36 is formed of a hollow cylindrical shape to be able to accommodate the lens unit 34, and supported to the circuit board 40 through a support member 46.

The lens unit 34 has a characteristic of the lens having a short focus and a wide image angle by combining the convex lens together with the concave lens. In this way, the lens unit 34 can be moved close to the finger 12 as an object, and a wide ranged image can be brought in the image pickup device 28 even though the lens unit 34 is moved close to the finger 12.

Therefore, a distance (conjugate distance) L1 between a finger pad 48 and the image pickup device 28 can be reduced, and the conjugate distance can be set to a range of 5.0 mm to 12.0 mm.

Further, a reference numeral 50 indicates a just-focus-point position, and a reference symbol L2 indicates a just-focus-point length between the just-focus-point position 50 in the finger 12 and the image pickup device 28. In this way, the lens mechanism 26 is moved forward and backward relative to the image pickup device 28 to adjust an interval between the lens unit 34 and the image pickup device 28 such that the just-focus-point position 50 is set in the finger 12.

Figure 4:
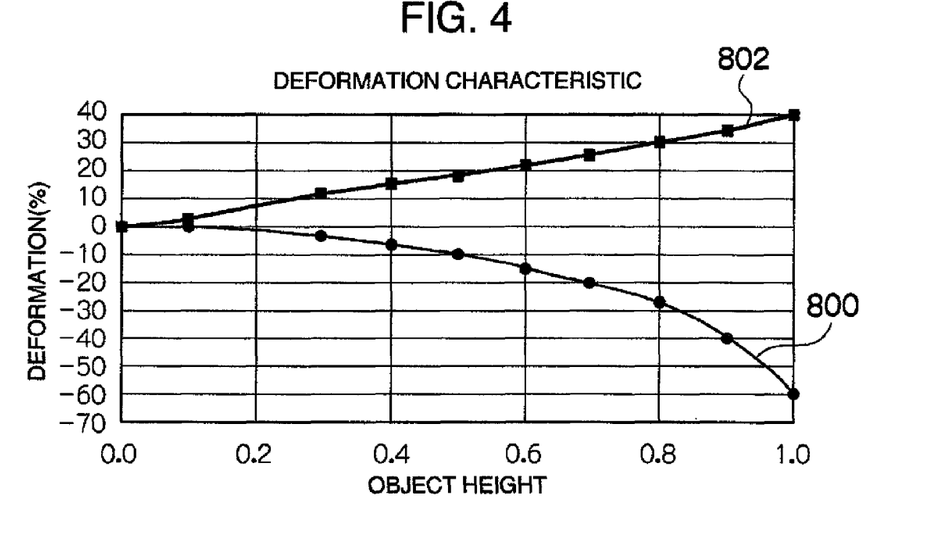
FIG. 4 is a characteristic diagram showing an example of a relation between an object height and a deformation (%)

FIG. 4 is a graph showing a deformation characteristic. An object height shown in FIG. 4 indicates a relative position from an image center point (optical axis 38) to an image end portion. For example, the object height "1.0" indicates a position of an endmost portion of the image, and the object height "0.6" represents that the image center point is positioned at 60% (40% from the end portion).

Referring to FIG. 4, a reference numeral 800 denotes a characteristic of a first lens unit, and 802 denotes a characteristic of a second lens unit. What the deformation characteristic is minus means that the image is deformed toward the center side, and is plus means that the image is deformed toward a direction away from the image center.

The deformation (%) is a value corresponding to a "T/S" where "T" is a distance from the center at a primary position of the image, and "S" is a distance from the center at an image position after deformed. In the case where an optical deformation is larger than −60% in the minus characteristic in FIG. 4, a resolution around a periphery portion is deteriorated immediately, so that the image cannot be sometimes restored completely even though the image deformation is corrected.

Further, in the case where the optical deformation exceeds +50%, it is necessary to process the images in a wide range, so that there sometimes arises a problem for a processing time period. Therefore, the deformation can be corrected in an image processing unit, as long as the deformation is limited to the first characteristic 800 and second characteristic 802, that is, the optical deformation is present in a range from −60% to +50%.

It is desirable that a sensitivity ratio at an object-side maximum image angle is equal to or greater than 10% and equal to or less than 60%, as the characteristic of the lens unit 34. Further, it is desirable that the sensitivity ratio is equal to or greater than 40% and equal to or less than 65%.

Referring back to FIG. 1 and FIG. 2, card positioning slits 52 are formed in the housing 10 such that they face to the both sides of the finger 12. The card-type recording medium 14 is placed into the card positioning slits 52. FIG. 2 shows a condition where the card-type recording medium 14 is placed into the card positioning slits 52. That is, the housing 10 accommodates the finger 12 to be faced to the image pickup device 28 as a detection unit. In the case of a condition where the finger 12 is not present, the housing 10 functions as an accommodation unit to accommodate the card-type recording medium 14 to be opposed to the image pickup device 28.

Figure 5A:
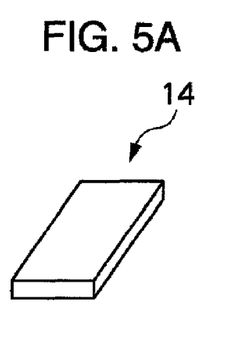
FIG. 5A is a perspective view showing a transparent layer of the card-type recording medium.

The card-type recording medium 14 is formed of a substantially rectangular shape as shown in FIG. 5A, and the thickness of that is in a range of 0.5 mm to 6.0 mm. The length and width of card-type recording medium 14 are set to values capable of placing it into the housing 10 and also in the card positioning slits 52.

Figure 5B:
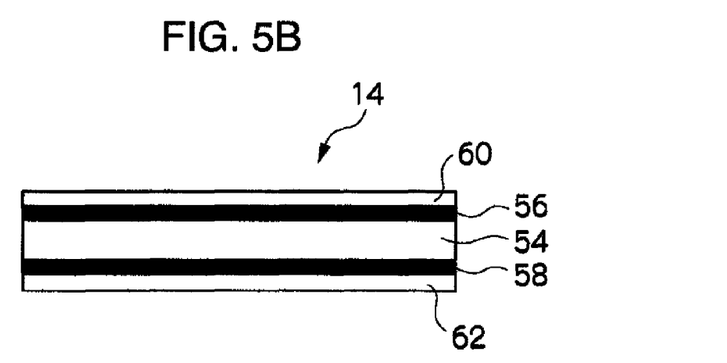
FIG. 5B is an enlarged section view showing the card-type recording medium.

The card-type recording medium 14 provides a transparent layer 54 to transmit the infrared light emitted from the infrared ray source 16, as shown in FIG. 5B. This transparent layer 54 is made up of polyacetal resin, for example. Light shield layers 56, 58 are formed on an upper side and a lower side of the transparent layer 54, and function as a visible light shielded filter to shield the visible lights. Protection layers 60, 62 are also formed on the respective light shield layers 56, 58 to protect the light shield layers 56, 58, and transmit the infrared light. The protection layers 60, 62 are made up of using a plastic material, for example.

Figure 6:
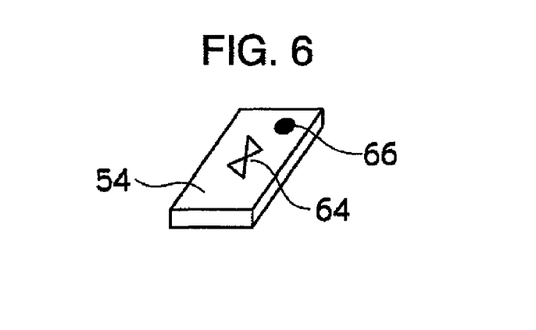
FIG. 6 is a perspective view showing the transparent layer of the card-type recording medium.

Referring to FIG. 6, a pseudo pattern 64 as the alternative information alternative to the vein pattern (feature information) of the finger 12 is drawn or characterized on the surface of the transparent layer 54 of the card-type recording medium 14, as an human inherent pattern, and a release mark 66 as a specialty symbol is also drawn or characterized thereon to make the biometric authentication device release the authentication by the feature information.

Figure 7:
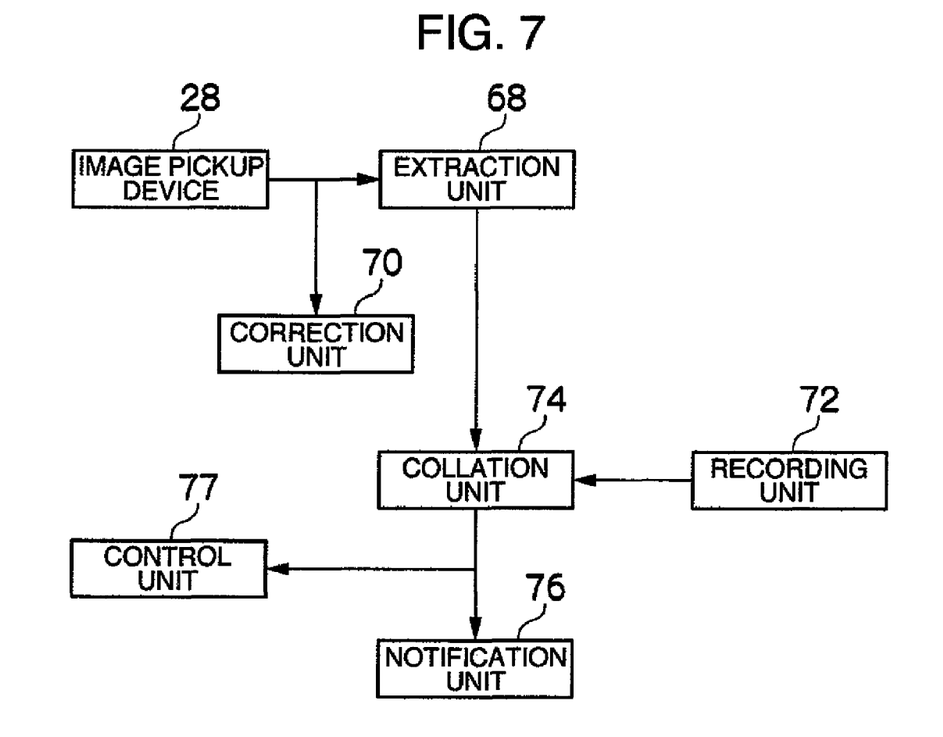
FIG. 7 is a functional block diagram showing an image processing device.

FIG. 7 is a functional block diagram showing an image processing device in the biometric authentication device. The image processing device is constituted by an extraction unit 68 to extract either the vein pattern in the finger 12 from an image produced by the image pickup device 28 as the detection unit or the pseudo pattern 64 on the card-type recording medium 14, a correction unit 70 to correct a deformation of the image, a recording unit 72 to previously record the pseudo pattern 64 corresponding to every biologic object having a vein pattern, a collation unit 74 to either collate the vein pattern extracted by the extraction unit 68 with the vein pattern recorded in the recording unit 72 or collate the pseudo pattern extracted by the extraction unit 68 with the pseudo pattern recorded in the recording unit 72, a notification unit 76 to notify a collated result of the collation unit 74 to the human, and a control unit 77 to control a control target in response to the collated result output from the collation unit 74.

Figure 8:
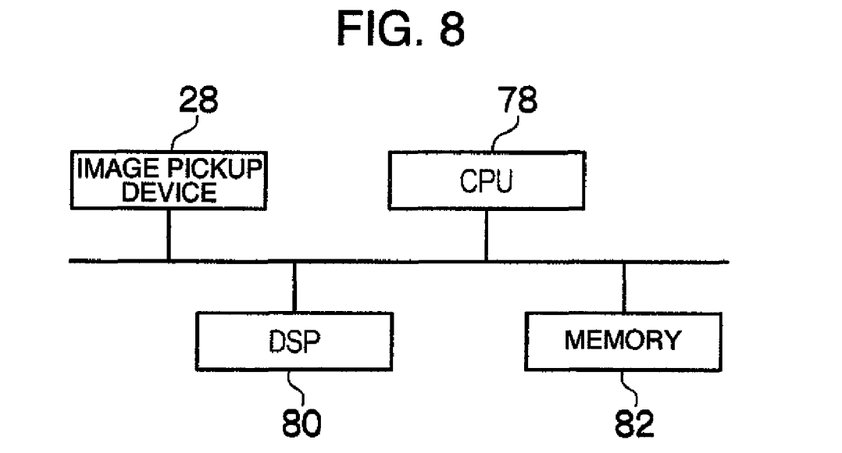
FIG. 8 is a block diagram showing the image processing device.

Specifically, as shown in FIG. 8, the image processing device includes a CPU (Central Processing Unit) 78 that functions as the extraction unit 68, collation unit 74, notification unit 76, and the control unit 77, a DSP (Digital Signal Processor) 80 that functions as the correction unit 70, and a memory 82 that functions as the recording unit 72.

The CPU 78 starts to execute an image processing program recorded in the memory 82 to be commanded to the DSP 80 for fetching the image from the image pickup device 28. The process of CPU 78 fetches luminance data of the respective pixels on the image pickup device 28 from the DSP 80 to thereby determine whether the finger 12 or card-type recording medium 14 is placed into the housing 10.

If the finger 12 or card-type recording medium 14 is not placed into the housing 10, the process of CPU 78 determines that the finger 12 or card-type recording medium 14 is not placed into the housing 10 since the outside light is reached to the image pickup device 28 to rise the pixel luminance beyond a predetermined value.

On the other hand, if the process of CPU 78 determines that the finger 12 or card-type recording medium 14 is placed into the housing 10, the process checks the luminance of the respective pixels of the image obtained by the image pickup device 28 to control a light amount of the infrared light emitted from the infrared ray source 16 such that the luminance of the respective pixels is made uniformed.

For example, in the case where the thickness of finger 12 is thin, the process of CPU 78 outputs a drive signal to the infrared ray source 16 such that the light amount becomes lowered, since there is a tendency for the luminance to rise, compared with the thick finger 12. Further, in the case of the thin finger 12 in width, the light is hard to be reached to the finger 12 since a distance from the bottom surface 22 to the image pickup device 28 becomes far, compared with the thick finger 12 in width. For this reason, the process of CPU 78 controls to make the light amount strong, emitted from the infrared ray source 16, such that a sufficient light amount is irradiated on the finger 12.

Furthermore, since a tip portion and a proximal portion of the finger 12 are different in width even if the same sort of finger, an appropriate light amount irradiated on the finger is different in the finger portions. Therefore, the process of CPU 78 controls independently a light amount value for the tip and proximal portions of the finger 12. The process of CPU 78 may adjust the light amount in advance to control simultaneously the light amount for the tip and proximal portions of the finger 12, such that the light amount for the proximal portion becomes strong by using a feature of the finger 12, the tip portion of which is thin and the proximal portion of which becomes increasingly thick from the tip portion.

The process of CPU 78 determines that the correction of light amount is terminated to then command to the DSP 80 to execute a deformation correction for the image produced by the image pickup device 28. The deformation correction in the DSP 80 is executed by an operation on the basis of the deformation characteristic. Therefore, the deformation characteristic of the lens unit 34 is obtained to then store in the memory 82 in advance, prior to shipping the biometric authentication device. The process of DSP 80 refers to the deformation characteristic to execute the deformation correction for the respective pixels obtained from the image pickup device 28.

In the case where the deformation is X%, a correction value (100/X) is multiplied to a correction targeted pixel of the image to correct an image position regarding an image center (optical axis) on the basis of an operated result. That is, in the case where the deformation indicates plus, the pixel position is corrected toward the optical axis, and in the case where it indicates minus, the pixel position is corrected toward a direction away from the optical axis.

Next, the process of CPU 78 stores the deformation corrected image in the memory 82, determines a contrasting density of the respective pixels of the corrected monochrome image, and extracts either the vein pattern or pseudo pattern from the corrected image (extraction of a feature point).

Since the infrared light, emitted from the infrared ray source 16, irradiated on the finger 12 is absorbed into hemoglobin in the vein and also spread in various directions by the other tissues, the transmitted light corresponding to the vein pattern is reached to the image pickup device 28 via the lens unit 34. The transmitted light is made weak in a pixel domain corresponding to the vein pattern by the absorption, therefore, the monochrome image having a dark domain corresponding to the vein pattern is obtained by the image pickup device 28.

Further, since the infrared light, emitted from the infrared ray source 16, irradiated on the card-type recording medium 14 is transmitted through the protection layer 60, light shield layer 56, transparent layer 54, light shield layer 58, and the protection layer 62, the transmitted light corresponding to the pseudo pattern 64 and the release mark 66 is reached to the image pickup device 28 via the lens unit 34. The transmitted light is made weak in the pixel domain corresponding to the pseudo pattern 64 and release mark 66 by the absorption, therefore, the monochrome image having a dark domain corresponding to the pseudo pattern 64 and release mark 66 is obtained by the image pickup device 28.

The process of CPU 78 detects the vein pattern or pseudo pattern 64 and the release mark 66 from the monochrome image to then authenticate the biologic object by using the detected vein pattern or pseudo pattern 64 and the release mark 66.

Specifically, the process of CPU 78 records the extracted vein pattern and pseudo pattern 64 in the memory 82, determines whether the recorded vein pattern is matched with the newly extracted vein pattern, and then determines whether the authentication of the human is passed. Further, the process of CPU 78 records the extracted pseudo pattern 64 and release mark 66 in the memory 82, determines whether the recorded pseudo pattern is matched with the newly extracted pseudo pattern, and then determines whether the authentication of the human is passed.

At this time, the process of CPU 78 notifies an authentication result of the human to an information processing device and an external device. By using the authentication result, the information processing device and external device provide a security related service for the human.

Figure 9A:
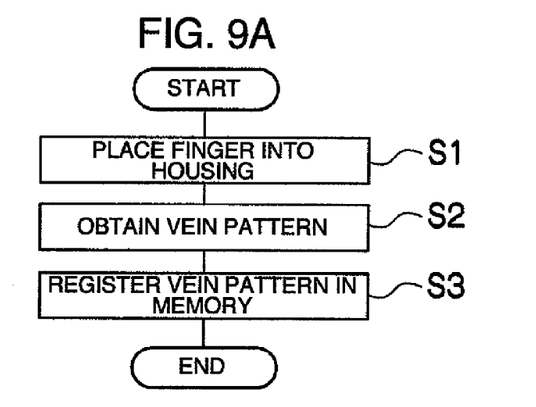
FIG. 9A is a flowchart for explaining a registration of a vein pattern.

On registering the vein pattern, as shown in FIG. 9A, the human places his/her finger 12 into the housing 10 of the biometric authentication device at a step S1. The process of CPU 78 obtains the vein pattern on the basis of the image on the image pickup device 28 at a step S2. The obtained vein pattern is then registered as feature information in the memory 82 at a step S3.

Figure 9B:
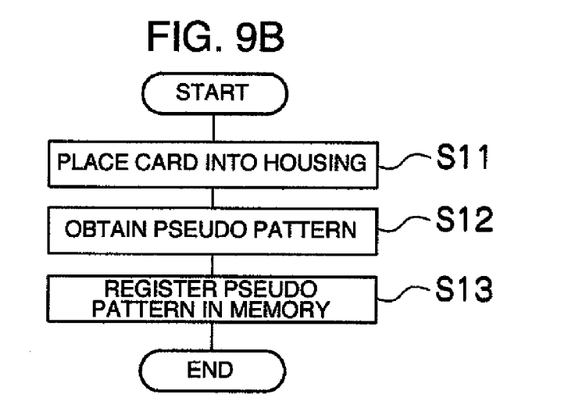
FIG. 9B is a flowchart for explaining the registration of a pseudo pattern.

On registering the pseudo pattern, as shown in FIG. 9B, the human places his/her card-type recording medium 14 into the housing 10 of the biometric authentication device at a step S11. The process of CPU 78 obtains the pseudo pattern 64 as alternative information on the basis of the image on the image pickup device 28 at a step S12. The obtained pseudo pattern is then registered as human inherent information in the memory 82 at a step S13.

Figure 9C:
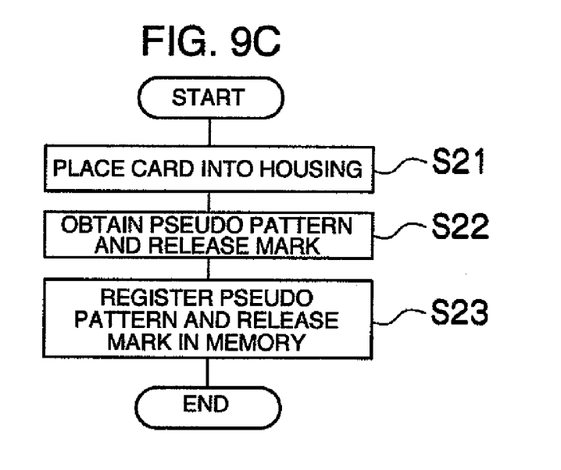
FIG. 9C is a flowchart for explaining the registration of the pseudo pattern and a release mark.

Further, on registering the pseudo pattern in the case where the release mark 66 is drawn or characterized on the transparent layer 54, as shown in FIG. 9C, the human places his/her card-type recording medium 14 into the housing 10 at a step S21. The process of CPU 78 obtains the pseudo pattern 64 as alternative information and the release mark 66 on the basis of the image on the image pickup device 28 at a step S22.

The obtained pseudo pattern 64 and release mark 66 are then registered as the human inherent information in the memory 82 at a step S23.

Figure 10:
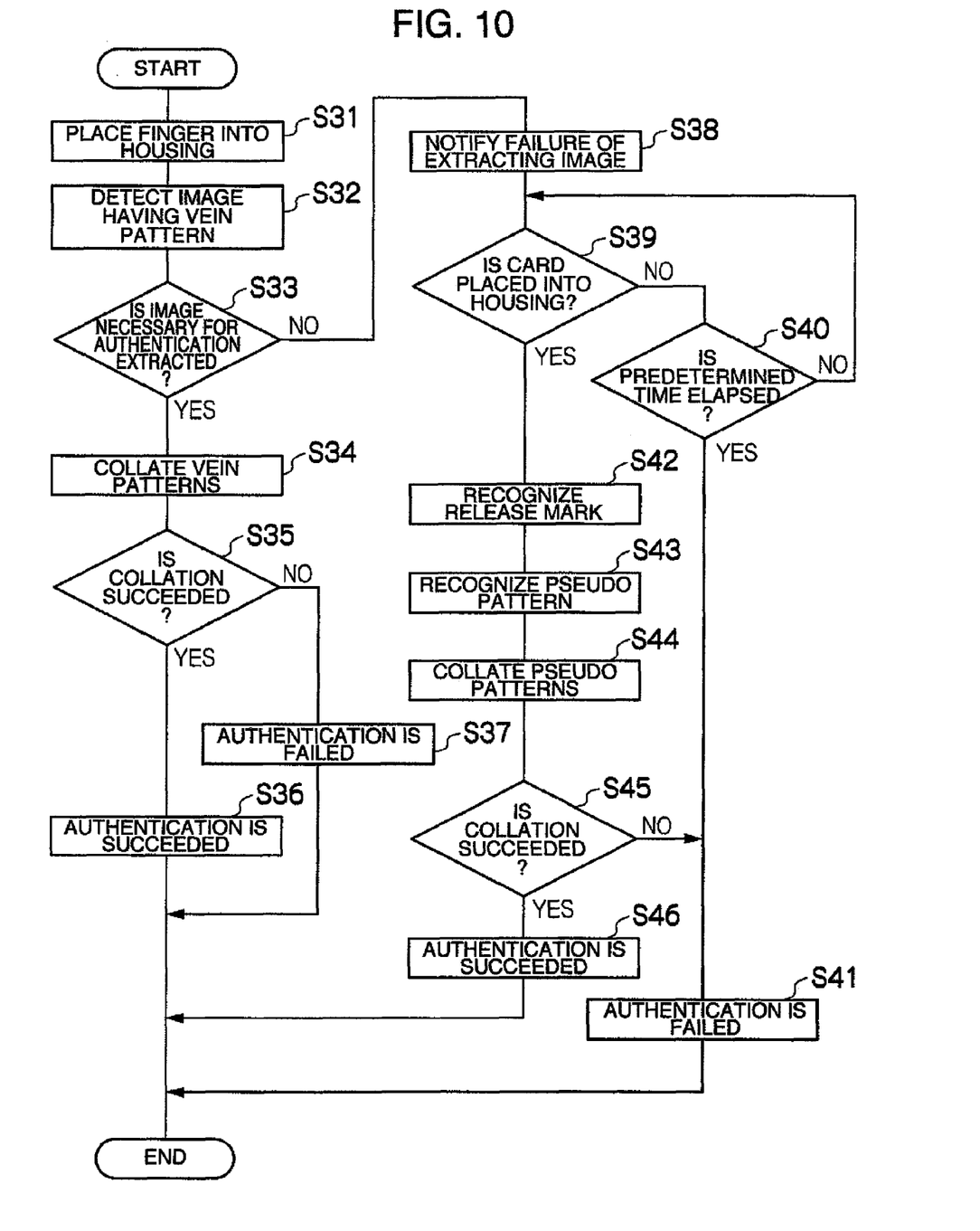
FIG. 10 is a flowchart for explaining an operation of a first embodiment in the invention.

Next, an operation of a first embodiment in the invention will be described with reference to FIG. 10 showing a flowchart. First, the human places his/her finger 12 into the housing 10 at a step S31. The image pickup device 28 detects an image of the vein pattern of the finger 12 as the feature information at a step S32. Thereafter, the process of CPU 78 fetches the image on the image pickup device 28 therein to determine whether the image necessary for the authentication is extracted, that is, whether the vein pattern as the feature information on the part of the biologic object is extracted from the image at a step S33.

If the process of CPU 78 determines that the image necessary for the authentication is extracted, the process refers to the memory 82 on the basis of the extracted feature information (vein pattern) to thereby collate the extracted vein pattern with the vein pattern registered in the memory 82 at a step S34.

Here, the process of CPU 78 determines whether the collation is succeeded for the extracted vein pattern and the vein pattern registered in the memory 82 at a step S35. If the collation is succeeded, the process of CPU 78 determines that the authentication is succeeded, that is, the extracted vein pattern is of a specific biologic object or of the human, then notifies an authentication success to the human at a step S36, and terminates the successive process. On the other hand, if the collation is failed, the process of CPU 78 determines that the authentication is failed, then notifies an authentication failure to the human at a step S37, and then terminates the successive process.

At the step S33, if the process of CPU 78 determines that the image necessary for the authentication is not extracted, the process notifies that the image is not extracted, to the human, and executes a process of requesting for the human to place the card-type recording medium 14 into the housing 10 at a step S38.

Thereafter, the process of CPU 78 determines whether the card-type recording medium 14 is placed into the housing 10 at a step S39. If the card-type recording medium 14 is not placed into the housing 10, the process of CPU 78 determines whether a predetermined time period is elapsed at a step S40. If the predetermined time period is elapsed, the process of CPU 78 notifies the authentication failure to the human at a step S41, and then terminates the successive process.

On the other hand, if the process of CPU 78 determines that the card-type recording medium 14 is placed into the housing 10 at a step S39, the process recognizes the release mark 66 on the basis of the image on the image pickup device 28 at a step S42, subsequently, the pseudo pattern 64 is recognized at a step S43. Thereafter, the process of CPU 78 refers to the memory 82 on the basis of the recognized pseudo pattern 64 to collate the recognized pseudo pattern 64 with the pseudo pattern registered in the memory 82 at a step S44.

Here, the process of CPU 78 determines whether the collation is succeeded for the recognized pseudo pattern 64 and the pseudo pattern registered in the memory 82 at a step S45. If the collation is succeeded, the process of CPU 78 notifies the authentication success to the human at a step S46, and terminates the successive process. If the collation is failed, the process of CPU 78 notifies the authentication failure to the human at the step S41, and then terminates the successive process.

According to the above-mentioned process, the human who can register the vein pattern is allowed to authenticate himself/herself by placing the finger 12 into the housing 10 of the biometric authentication device. The human who cannot register the vein pattern is also allowed to authenticate himself/herself by placing the card-type recording medium 14 into the housing 10 thereof, even though the human cannot be authenticated by placing his/her finger 12 into the housing 10.

Figure 11:
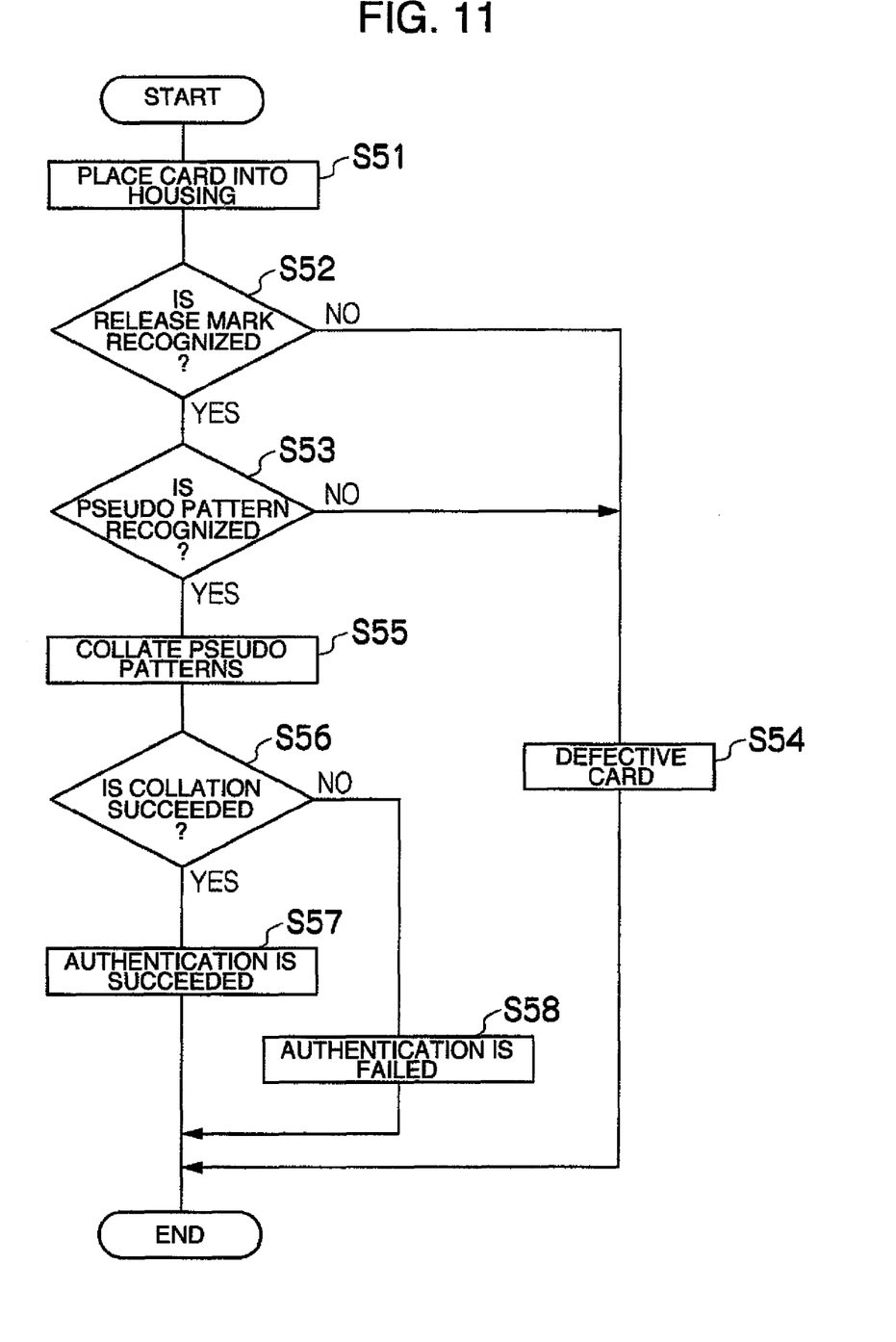
FIG. 11 is a flowchart for explaining an operation of a second embodiment in the invention.

Next, an operation of a second embodiment in the invention will be described with reference to FIG. 11 showing a flowchart. First, the human places the card-type recording medium 14 into the housing 10 at a step S51. The process of CPU 78 then determines whether the release mark 66 is recognized on the basis of the image on the image pickup device 28 at a step S52.

By recognizing the release mark 66, subsequently, the process of CPU 78 determines whether the pseudo pattern 64 is recognized at a step S53.

If the release mark 66 or the pseudo pattern 64 are not recognized at the steps S52 and S53, the process of CPU 78 notifies the authentication failure caused by the card-type recording medium 14 to the human at a step S54, and then terminates the successive process.

If the release mark 66 and the pseudo pattern 64 are recognized, the process of CPU 78 refers to the memory 82 on the basis of the recognized pseudo pattern (alternative pattern) to collate the recognized pseudo pattern 64 with the pseudo pattern recorded in the memory 82 at a step S55, and determines whether the collation is succeeded at a step S56.

If the collation is succeeded, the process of CPU 78 notifies the authentication success caused by the card-type recording medium 14 to the human at a step S57, and terminates the successive process. If the collation is failed, the process of CPU 78 notifies the authentication failure caused by the card-type recording medium 14 to the human at a step S58, and terminates the successive process.

According to the above-mentioned process, the human who cannot register the vein pattern is allowed to authenticate himself/herself by placing the card-type recording medium 14 into the housing 10 of the biometric authentication device, even though the human cannot be authenticated by placing his/her finger 12 into the housing 10.

Figure 12:
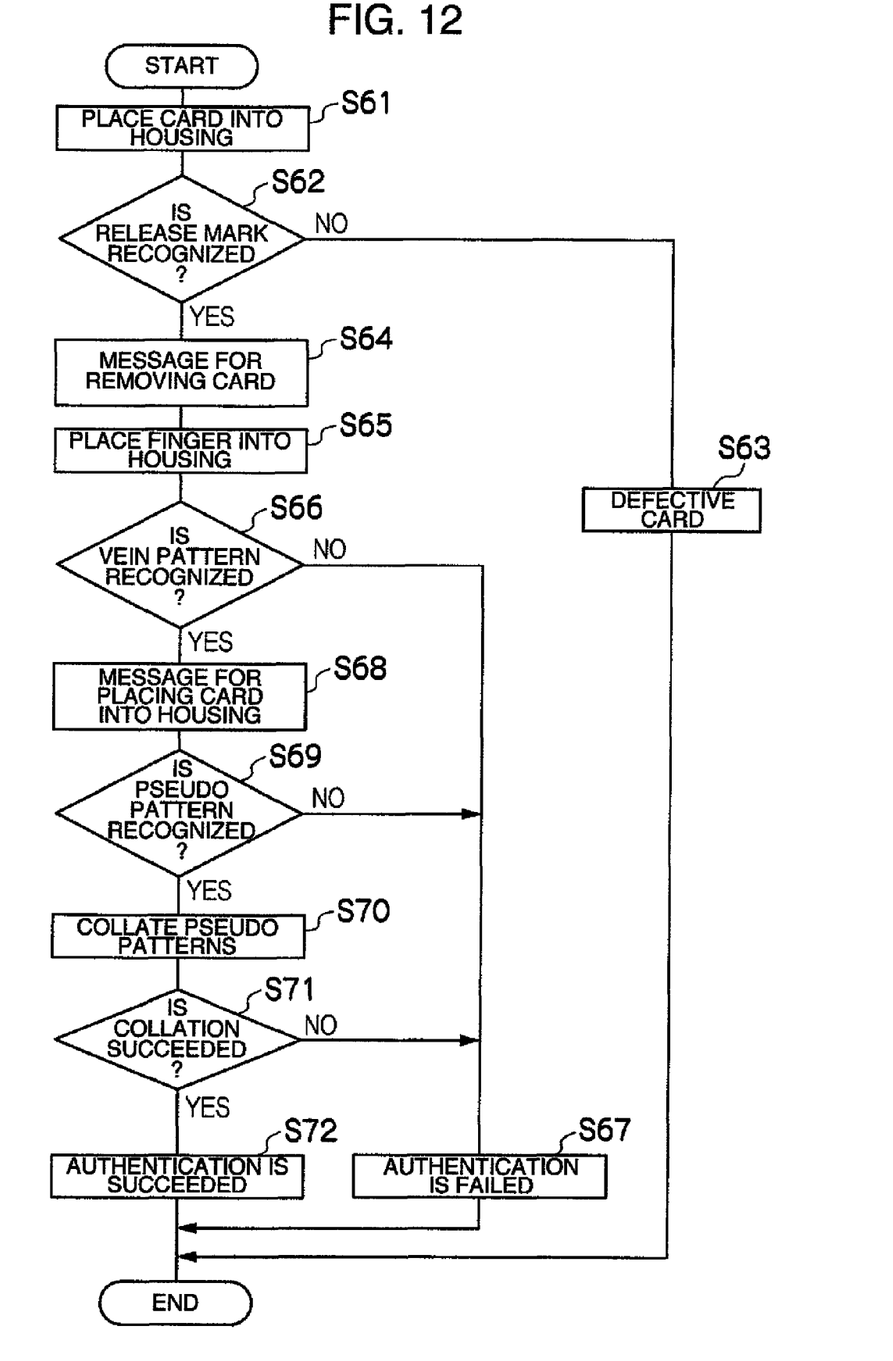
FIG. 12 is a flowchart for explaining an operation of a third embodiment in the invention.

Next, an operation of a third embodiment in the invention will be described with reference to FIG. 12 showing a flowchart. First, the human places the card-type recording medium 14 into the housing 10 at a step S61. The process of CPU 78 determines whether the release mark 66 is recognized on the basis of the image on the image pickup device 28 at a step S62. If the release mark 66 is not recognized, the process of CPU 78 notifies the authentication failure caused by the card-type recording medium 14 to the human at a step S63, and terminates the successive process. If the release mark 66 is recognized, the process of CPU 78 notifies a message indicating that "once the card-type recording medium 14 is removed from the housing 10" to the human at a step S64.

The finger 12 of the human is placed into the housing 10 at a step S65, after the card-type recording medium 14 is removed from the housing 10. The process of CPU 78 determines whether some vein patterns (blood vessel patterns) are recognized on the basis of the image on the image pickup device 28 at a step S66. At this time, if some vein patterns cannot be recognized from the finger 12 of the human, the process of CPU 78 notifies the authentication failure caused by the card-type recording medium 14 to the human at a step S67, and then terminates the successive process. If some vein patterns are recognized, the process of CPU 78 notifies a message indicating that "the card-type recording medium 14 is again placed into the housing 10" to the human at a step S68.

Thereafter, by placing again the card-type recording medium 14 into the housing 10, the process of CPU 78 determines whether the pseudo pattern 64 is recognized on the basis of the image on the image pickup device 28 at a step S69. At this time, the process of CPU 78 proceeds to the step S67 if the pseudo pattern 64 is not recognized, and notifies the authentication failure caused by the card-type recording medium 14 to the human. If the pseudo pattern 64 is recognized, the process of CPU 78 refers to the memory 82 on the basis of the recognized pseudo pattern 64.

The process of CPU 78 then collates the recognized pseudo pattern 64 with the pseudo pattern registered in the memory 82 at a step S70, and determines whether the collation is succeeded at a step S71. At this time, if the collation is succeeded, the process of CPU 78 notifies the authentication success caused by the card-type recording medium 14 to the human at a step S72. If the collation is failed, the process of CPU 78 notifies the authentication failure caused by the card-type recording medium 14 to the human at the step S67, and terminates the successive process.

According to the above-mentioned process, the human who is not allowed to register the vein pattern can be authenticated for himself/herself by placing the card-type recording medium 14 into the housing 10 of the biometric authentication device, even though the human cannot be authenticated by placing the finger 12 into the housing 10. Further, a pseudo operation for authenticating the biologic object may be requested for the biometric authentication device.

Figure 13:
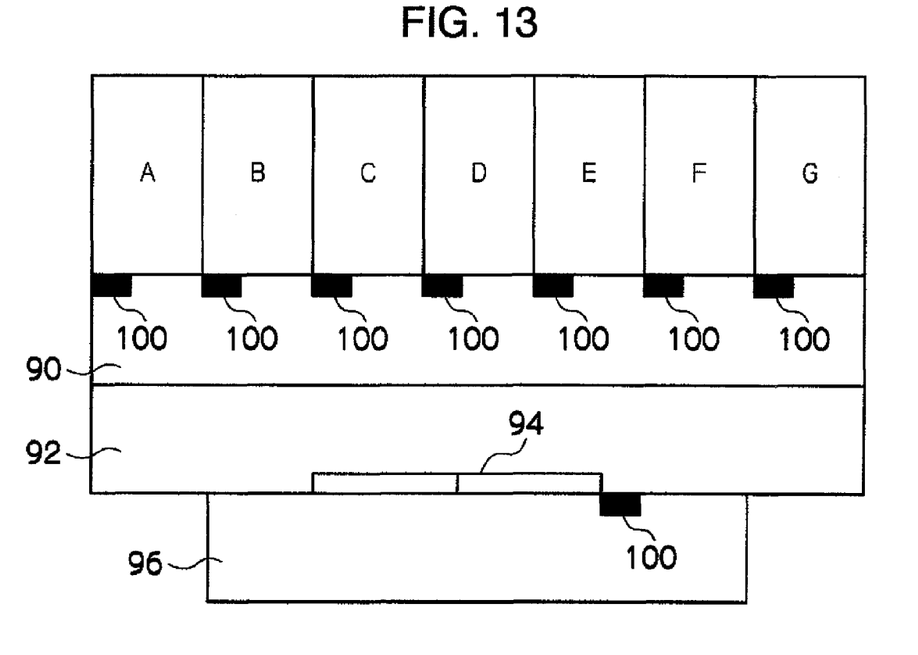
FIG. 13 is a plan view showing an apartment complex.

FIG. 13 is a plan view showing an apartment complex with the biometric authentication devices applied to an entering and leaving management system as a security system. Referring to FIG. 13, the apartment complex includes rooms A to G that are located along a corridor 90. The corridor 90 is adjacent to a lobby 92, and an automatic door 94 is located at the center part of lobby 92. An entrance 96 is also located outside the automatic door 94.

A biometric authentication device 100 is installed adjacent to the automatic door 94, and devices 100 are also installed adjacent to doors of the rooms A to G.

The biometric authentication devices 100 installed on the entrance 96 and the rooms A to G are the same type. The vein patterns or pseudo patterns 64 in relation to dwellers in the respective rooms A to G are all recorded in the memory 82 of the biometric authentication device 100 installed on the entrance 96, and the vein patterns and pseudo patterns 64 of the dwellers in the respective rooms A to G are also recorded in the memory 82 of the biometric authentication devices 100 at the respective rooms A to G.

In this way, any one of the dwellers in the apartment complex places his/her finger 12 or the card-type recording medium 14 into the housing 10 of the biometric authentication device 100 to execute a biometric authentication process by the biometric authentication device 100.

For example, by placing the finger 12 of dweller into the housing 10 of the biometric authentication device 100 at the entrance 96, the process of CPU 78 refers to the memory 82 on the basis of the vein pattern extracted from the image on the image pickup device 28 to thereby collate the extracted vein pattern with the vein pattern registered in the memory 82.

Here, the process of CPU 78 determines that the collation is succeeded, and then opens the automatic door 94 by the process of control unit 77 for controlling the automatic door 94. Therefore, the dweller can move up to the lobby 92 and corridor 90 through the automatic door 94. In addition, the automatic door 94 remains closed by the process of control unit 77 if the process of CPU 78 determines that the collation is failed. At this time, the process of CPU 78 notifies the authentication failure to the dweller whose finger 12 is placed into the housing 10.

On the other hand, by placing the card-type recording medium 14 in place of the finger 12 into the housing 10 of the biometric authentication device 100 at the entrance 96, the process of CPU 78 refers to the memory 82 on the basis of the pseudo pattern 64 extracted from the image produced by the image pickup device 28 to collate the extracted pseudo pattern 64 with the pseudo pattern recorded in the memory 82.

Here, the process of CPU 78 determines that the collation is succeeded, and then opens the automatic door 94 by the process of control unit 77. Therefore, the dweller can move up to the lobby 92 and corridor 90 through the automatic door 94. In addition, the automatic door 94 remains closed by the process of control unit 77 if the process of CPU 78 determines that the collation is failed. At this time, the process of CPU 78 notifies the authentication failure to the dweller whose card-type recording medium 14 is placed into the housing 10.

Thereafter, for example, the dweller in the room A places his/her finger 12 or card-type recording medium 14 into the housing 10 of the biometric authentication device 100 installed on an entrance of the room A to execute the biometric authentication process by the biometric authentication device 100. In also this case, the same biometric authentication process is executed as the above-mentioned biometric authentication process executed in the biometric authentication device 100 of the entrance 96. The process of CPU 78 determines that the authentication is succeeded, and then opens the entrance door of room A by the process of control unit 77, therefore, the dweller can move into the room A. In addition, the entrance door of room A remains closed if the authentication is failed.

According to the above-mentioned embodiment, the dweller in the apartment complex places his/her finger 12 or card-type recording medium 14 into the housing 10 of the biometric authentication device 100 installed on either the entrance 96 or the respective rooms A to G to thereby open and close the automatic door 94 and the room door of the dweller. That is, the dweller whose pseudo pattern 64 is registered can open and close the automatic door 94 and the door of own room by executing the authentication in the biometric authentication device 100, regardless of either the dweller who registers the vein pattern or who cannot register the vein pattern.

In addition, this embodiment has described the invention applied to the apartment complex, but the invention can also be applied to a so-called entering and leaving management system for use in hotels, passenger boats, general buildings, schools, bank boxes, locker elevators, etc.

Further, the respective biometric authentication devices 100 are connected to a server to be able to authenticate the human who moves at the respective rooms A to G and the entrance 96, alternative to respectively authenticating the human by the biometric authentication device 100 installed on the respective rooms A to G and by the biometric authentication device 100 installed on the entrance 96.

Furthermore, this embodiment has described the biometric authentication device as used for a vein authentication device, however, the biometric authentication device in the invention can also be used for detecting a fingerprint as used the vein pattern of a palm of the hand, other than the vein authentication device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A biometric authentication device configured to detect feature information of a biologic object in order to authenticate the biologic object, comprising:
   a detection unit configured to detect an image having the feature information from a part of the biologic object;
   an accommodation unit configured to accommodate such that the part of the biologic object is adapted to the detection unit;
   an extraction unit configured to extract the feature information from the image; and
   a determination unit configured to determine whether the extraction unit extracts the feature information necessary for an authentication;
   wherein the accommodation unit is configured to accommodate a card-type recording medium configured to provide alternative information alternative to the feature information, such that the card-type recording medium is faced to the detection unit, with the part of biologic object absent; and
   wherein when the determination unit determines that the extraction unit does not extract the feature information necessary for the authentication, the detection unit is configured to detect the alternative information from the card-type recording medium.

2. The device according to claim 1, further comprising:
   a recording unit configured to register plural pieces of the feature information for every biologic object;
   a collation unit configured to refer to the recording unit to collate the extracted feature information; and
   a notification unit configured to notify a collated result obtained from the collation unit.

3. The device according to claim 2,
   wherein the extraction unit is configured to extract the alternative information from the card-type recording medium;
   wherein the recording unit is configured to record the alternative information for every biologic object; and
   wherein the collation unit is configured to refer to the recording unit in accordance with the extracted alternative information, to determine a specific biologic object relevant to the extracted alternative information.

4. The device according to claim 2,
   wherein the collation unit is configured to determine a specific biologic object relevant to the extracted feature information in accordance with a condition wherein the extracted feature information is matched with the feature information recorded in the recording unit.

5. The device according to claim 3,
   wherein the extraction unit is configured to extract a specialty symbol recorded in the card-type recording medium, thereafter, the collation unit is configured to collate the alternative information without collating the feature information.

6. The device according to claim 1, further comprising:
   a recording unit configured to register plural pieces of each of the feature information and the alternative information for every biologic object;
   a collation unit configured to collate the extracted feature information with the feature information recorded in the recording unit on extracting the feature information by the extraction unit, and the extracted alternative information with the alternative information recorded in the recording unit on extracting the alternative information by the extraction unit; and a notification unit configured to notify a collated result obtained from the collation unit;

wherein the extraction unit is configured to extract the feature information from the image and the alternative information from the card-type recording medium.

7. The device according to claim 6, further comprising:
a control unit configured to control a control target in accordance with the collated result obtained from the collation unit.

8. A biometric authentication method of authenticating a biologic object by detecting feature information of the biologic object, comprising the steps of:
detecting an image having the feature information from a part of the biologic object;
extracting the feature information from the image; and
determining whether the feature information necessary for an authentication has been extracted in the extracting step;
wherein a card-type recording medium configured to provide alternative information alternative to the feature information is accommodated such that the card-type recording medium is faced to the detection unit, with the part of biologic object absent; and
wherein when the determining step determines that the feature information necessary for the authentication has not been extracted in the extracting step, the alternative information from the card-type recording medium is detected in the detecting step.

9. A biometric authentication device configured to detect feature information of a biologic object in order to authenticate the biologic object, comprising:
a detection unit configured to detect an image having the feature information from a part of the biologic object;
an accommodation unit configured to accommodate a card-type recording medium configured to provide alternative information alternative to the feature information, such that the card-type recording medium is faced to the detection unit, with the part of biologic object absent, and such that the part of the biologic object is adapted to the detection unit;
an extraction unit configured to extract the feature information from the image; and
a determination unit configured to determine whether or not the extraction unit extracts the feature information necessary for an authentication, and when the determination unit determines that the extraction unit does not extract the feature information necessary for the authentication, the detection unit is configured to detect the alternative information from the card-type recording medium.

10. The device according to claim 9, further comprising:
a recording unit configured to register plural pieces of the feature information for every biologic object;
a collation unit configured to refer to the recording unit to collate the extracted feature information; and
a notification unit configured to notify a collated result obtained from the collation unit.

11. The device according to claim 10,
wherein the extraction unit is configured to extract the alternative information from the card-type recording medium;
wherein the recording unit is configured to record the alternative information for every biologic object; and
wherein the collation unit is configured to refer to the recording unit in accordance with the extracted alternative information, to determine a specific biologic object relevant to the extracted alternative information.

12. The device according to claim 10,
wherein the collation unit is configured to determine a specific biologic object relevant to the extracted feature information in accordance with a condition wherein the extracted feature information is matched with the feature information recorded in the recording unit.

13. The device according to claim 11,
wherein the extraction unit is configured to extract a specialty symbol recorded in the card-type recording medium, thereafter, the collation unit is configured to collate the alternative information without collating the feature information.

14. The device according to claim 9, further comprising:
a recording unit configured to register plural pieces of each of the feature information and the alternative information for every biologic object;
a collation unit configured to collate the extracted feature information with the feature information recorded in the recording unit on extracting the feature information by the extraction unit, and the extracted alternative information with the alternative information recorded in the recording unit on extracting the alternative information by the extraction unit; and
a notification unit configured to notify a collated result obtained from the collation unit;
wherein the extraction unit is configured to extract the feature information from the image and the alternative information from the card-type recording medium.

15. The device according to claim 14 further comprising:
a control unit configured to control a control target in accordance with the collated result obtained from the collation unit.

16. A biometric authentication method of authenticating a biologic object by detecting feature information of the biologic object, comprising the steps of:
detecting an image having the feature information from a part of the biologic object;
extracting the feature information from the image; and
determining whether or not the feature information necessary for an authentication has been extracted in the extracting step, and when determining that the feature information necessary for the authentication has not been extracted in the extracting step, the alternative information from the card-type recording medium is detected in the detecting step;
wherein a card-type recording medium configured to provide alternative information alternative to the feature information is accommodated such that the card-type recording medium is faced to the detection unit, with the part of biologic object absent.

17. A biometric authentication device that detects feature information of a biologic object to authenticate the biologic object comprises:
a detection unit that detects an image having the feature information from a part of the biologic object;
an accommodation unit that accommodates such that the part of the biologic object is adapted to the detection unit; and
an image processing device including:
an extraction unit that extracts the feature information from the image,
a recording unit that registers plural pieces of the feature information for every biologic object,
a collation unit that refers to the recording unit to collate the extracted feature information, and
a notification unit that notifies a collated result obtained from the collation unit;

wherein the accommodation unit accommodates a card-type recording medium providing alternative information alternative to the feature information such that the card-type recording medium is faced to the detection unit, with the part of biologic object absent, and the detection unit detects the alternative information from the card-type recording medium;

wherein the extraction unit extracts the alternative information from the card-type recording medium;

wherein the recording unit records the alternative information for every biologic object;

wherein the collation unit refers to the recording unit in accordance with the extracted alternative information to determine a specific biologic object relevant to the extracted alternative information; and wherein the extraction unit extracts a specialty symbol recorded in the card-type recording medium, thereafter, the collation unit collates the alternative information without collating the feature information.

* * * * *